United States Patent [19]
Yamamoto

[11] Patent Number: 5,790,141
[45] Date of Patent: Aug. 4, 1998

[54] METHOD AND APPARATUS FOR INK-JET GRAY-SCALE PRINTING

[75] Inventor: Tadashi Yamamoto, Yokohama, Japan

[73] Assignee: Canon Kabushiki Kaisha, Tokyo, Japan

[21] Appl. No.: 454,083

[22] Filed: May 30, 1995

[30] Foreign Application Priority Data

May 31, 1994 [JP] Japan .................. 6-119274

[51] Int. Cl.$^6$ .............. B41J 2/205; B41J 2/145; B41J 2/15
[52] U.S. Cl. .................. 347/15; 347/41
[58] Field of Search .............. 347/3, 15, 37, 347/41; 358/296, 298, 502, 455, 456, 462, 465, 466

[56] References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,608,577 | 8/1986 | Hori | 347/66 |
| 4,723,129 | 2/1988 | Endo et al. | 347/56 |
| 4,740,796 | 4/1988 | Endo et al. | 347/56 |
| 5,430,469 | 7/1995 | Shioya et al. | 347/15 |

FOREIGN PATENT DOCUMENTS

| | | |
|---|---|---|
| 54056847 | 5/1979 | Japan . |
| 59-123670 | 7/1984 | Japan . |
| 59-138461 | 8/1984 | Japan . |
| 60-071260 | 4/1985 | Japan . |

*Primary Examiner*—N. Le
*Assistant Examiner*—L. Anderson
*Attorney, Agent, or Firm*—Fitzpatrick, Cella, Harper & Scinto

[57] ABSTRACT

When pixel is formed with respective of one ejection orifice through four times of scanning employing ejection groups formed by equally dividing ejection orifice group of an ink-jet head, number of ink droplets to be ejected in each scanning cycle is determined depending upon a half tone value of the pixel, and a remainder from division of a sum of a value indicating a current scanning cycle in the primary scanning direction for the pixel in question among a plurality of scanning cycles, and a value relating to the position of the pixel in question in the primary scanning direction by number of a plurality of scanning in a primary scanning direction. By this, the ejection orifice to be used for forming each pixel arranged in scanning direction is varied sequentially.

12 Claims, 7 Drawing Sheets

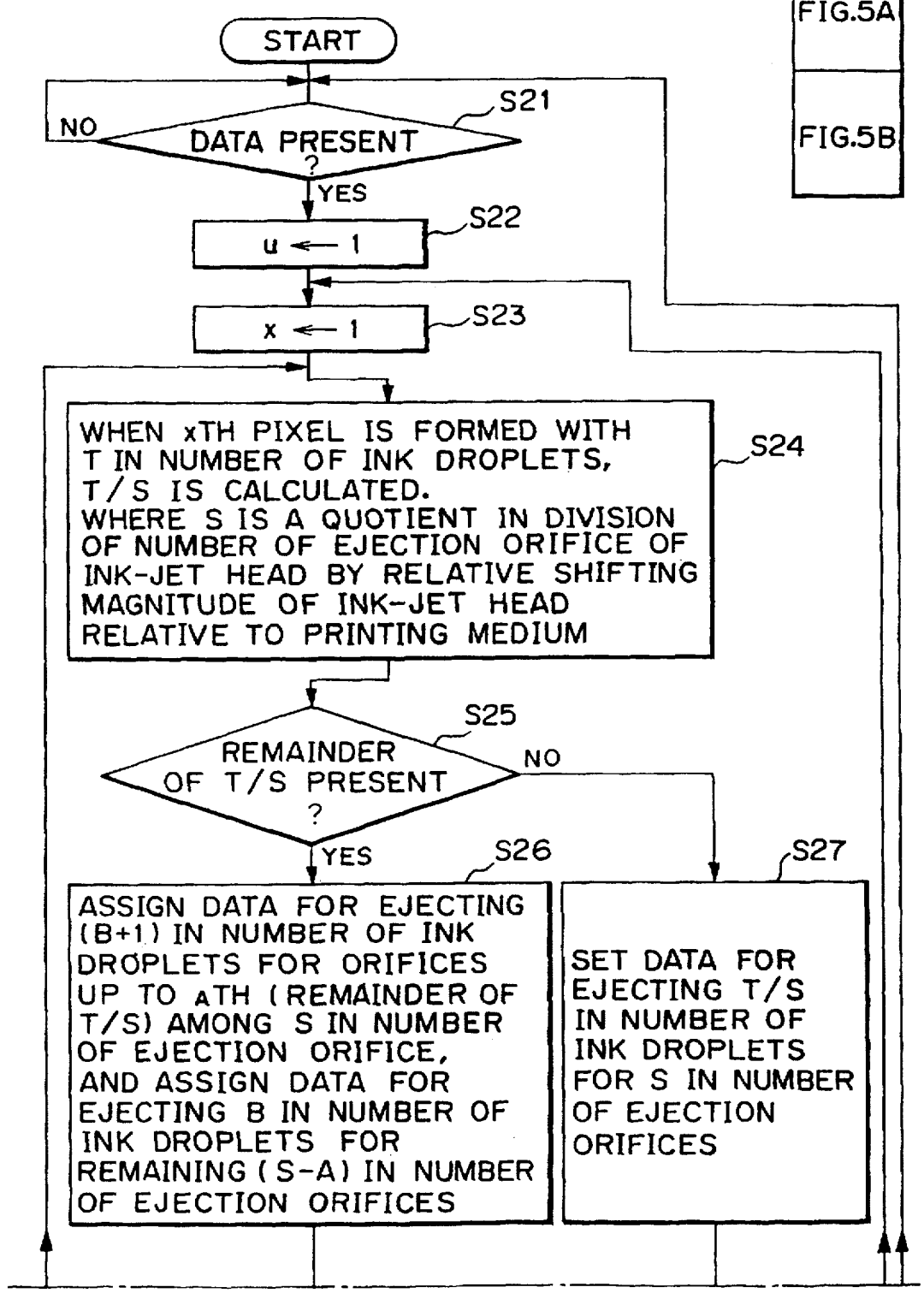

METHOD AND APPARATUS FOR INK-JET GRAY-SCALE PRINTING

BACKGROUND OF THE INVENTION

1. Field of the Invention

The present invention relates generally to an ink-jet printing apparatus and ink-jet printing method. More specifically, the invention relates to an ink-jet printing method and apparatus for printing a gray-scale (multi tone, half tone) image using an ink-jet head with a plurality of ejection orifices.

2. Description of Prior Art

An ink-jet printing system is designed to eject ink to a printing medium, such as a paper, depending upon a print signal. Such an ink-jet printing system is a system widely used for advantages of high speed printing and low noise associated with a printing operation. When higher printing speed is to be achieved in this type of system, it is effective measure to provide a greater number of ink ejection orifices. For instance, in a case of serial type printing apparatus, it can be easily achieved by aligning the ejection orifices in the direction perpendicular to a direction of relative motion between the printing medium and the ink-jet head for making it possible to print an increased area corresponding to the number of the ejection orifices in one scanning section.

On the other hand, as in the case where half tone printing is made by the ink-jet printing system, there would be provided that the size of the ink droplet to be ejected may be varied. However, such measure is not practical for a small range of variation of the ink droplet size. Another known method for half tone printing is to express the gray scale by controlling the number of ink droplets to be ejected on a unit area on the basis of a data obtained by pseudo gray scales image processing.

Also, as a further known system for printing a half tone image is to make individual ink droplets smaller and make it possible to eject a plurality of ink droplets to substantially the same position on the printing medium so that the half tone image may be expressed by controlling the number of ink droplets to be ejected on the same position (such system will be hereinafter referred to as "multi-droplet system"). This system is advantageous for the capability of half tone printing without causing lowering of resolution.

However, when half tone printing is performed with the multi-droplet system employing an ink-jet head (hereinafter also referred to as "head", occasionally) having a great number of ejection orifices, the conventionally known problem of non-uniformity (unevenness, fluctuation) of density may be further emphasized.

More specifically, as set forth above, while a greater number of ejection orifices is effective for high speed printing, increasing the number of the ejection orifices may increase the possibility of causing variations of ejection characteristics between individual ejection orifices due to variations in production. Therefore, when printing is performed by relative motion between the head and the printing paper, for example, it is possible to form bands of the non-uniform density extending in the direction of the relative motion. A greater number of the ejection orifices for wider printing width at one scanning should cause emphasis of low frequency component in spacial frequency of density non-uniformity, namely emphasis of repetition of density non-uniformity in the overall printed image, to cause degradation of the image quality.

When half tone printing is performed by using the head in which fluctuation of ejection characteristics between individual heads is present, density non-uniformity becomes further significant so that the bands of the density non-uniformity can be perceptible even when the fluctuation of characteristics between individual ejection orifices is merely several percents. In case of half tone printing with a multi-droplet system, since a plurality of ink droplets are ejected from each individual ejection orifice to the same position, non-uniformity of density can be further emphasized.

As a solution for such problems in the multi-droplet system, there is a proposal to eject a plurality of ink droplets forming one pixel from a plurality of mutually different ejection orifices for equalizing a fluctuation of ejection characteristics of the ejection orifices. However, when a pixel having low density is formed by this system, equalization becomes less effective since a smaller number of ejection orifices may contribute for formation of the pixel. Therefore, even in the system set forth above, the bands of density non-uniformity may be perceptible at the low density portion.

SUMMARY OF THE INVENTION

It is an object of the present invention to provide an ink-jet printing method and apparatus for reducing density non-uniformity in the case where half tone printing is performed with employing a multi-droplet system.

Another object of the invention is to provide an ink-jet printing method and apparatus which can reduce bands of density non-uniformity by sequentially varying ejection orifices to be used for forming pixels when pixels aligned in a primary scanning direction in the equal density so as to provide high probability of using different ejection orifices for mutually adjacent pixels and by spatially equalizing fine difference of ejection characteristics of ejection orifices when the pixels of low density are aligned sequentially in the primary scanning direction (direction of the relative motion between an ink-jet head and a printing medium).

In a first aspect of the present invention, there is provided an ink-jet printing apparatus using an ink-jet head having a plurality of ejection orifices, forming a pixel by ejecting ink through the ink-jet head toward a printing medium for performing printing with a set of the pixels, comprising:

primary scanning means for moving the ink-jet head in a primary scanning direction;

feeding means for feeding the printing medium in an auxiliary scanning direction different from the primary scanting direction;

determining means for determining a number of ink droplets to be ejected through ejection orifices of the ink-jet head during moving the ink-jet head in the primary scanning direction for a plurality of times so as to form respective pixels using different ejection orifices, the number of ink droplets being determined on the basis of a half tone value of the pixel, and a remainder from division of a sum of a value indicating a scanning cycle in the primary scanning direction for forming the pixel among a plurality of scanning cycles and a value relating to the position of the pixel in the primary scanning direction by the number of the plurality of scanning cycles; and control means for performing ejection of the number of ink droplets determined by the determining means at each pixel positions in each scanning cycle in the primary scanning direction.

Here, the number of ink droplets A may be determined by:

$A=(K(x, y)+(z/M+F(x))\% S)/S$ wherein K(x, y) is a half tone value at pixel position (x, y; x and y respectively represent position in the primary scanning direction and the auxiliary scanning direction), z is an ejection orifice number, M is a feeding amount of the printing medium expressed by number of the ejection orifices, F(x) is a predetermined function of the pixel position x, the operator "%" represents derivation of remainder in division of an integer therebefore by an integer thereafter, and the operator "/" represents derivation of quotient in division of an integer therebefore by an integer thereafter.

In a second aspect of the present invention, there is provided an ink-jet printing method for forming one pixel with m (integer of m≧2) in number of ink droplets using an ink-jet head having n (integer of n≧2) in number of ejection orifices, comprising the steps of:

provididing a construction that the n in number of ejection orifices of the ink-jet head are arrayed in a direction perpendicular to a direction of relative movement of a printing medium and the ink-jet head, and each pixel is formed by ejecting the m in number of ink droplets through S (an integer derived from n/L with cutting off a fraction less than 1) in number of ejection orifices different from each other by varying relative position between the ink-jet head and the printing medium in a pitch corresponding to L in number of ejection orifices in the direction of alignment of the n in number of ejection orifices, per every relative movement between the ink-jet head and the printing medium;

performing image formation of the pixel by ejecting T (an integer of T≦m) in total of ink droplets according to a half tone data of the pixel, the pixel being formed by ejecting (B+1) (B is an integer derived from T/S by cutting off a fraction less than 1) in a number of ink droplets through ejection orifices up to Ath (remainder of T/S) from the ejection orifice of highest preferential order and ejecting B in number of ink droplets through (S−A) in a number of ejection orifices in a lower preferential order, when there is a preferential order in use of S in the number of different ejection orifices, and a remainder is present in (T/S); and performing formation of an image of the pixel with T in total of ink droplets by ejecting (T/S) in number of ink droplets through S in number of different ejection orifices, when the remainder is not present in (T/S).

The above and other objects, effects, features and advantages of the present invention will become more apparent from the following description of embodiments thereof taken in conjunction with the accompanying drawings.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings:

FIGS. 3, 3A and 3B are flowcharts generally illustrating ejection data distribution process for respective ejection orifice in one embodiment of the ink-jet printing apparatus of the invention;

FIGS. 5, 5A and 5B are flowcharts generally illustrating the (ejection data distribution process which can obtain comparable printing result to that can be obtained through ejection data distribution process of FIG. 3.

DESCRIPTION OF THE PREFERRED EMBODIMENT

The preferred embodiment of an ink-jet printing apparatus according to the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order not to obscure the present invention.

Figure 1:
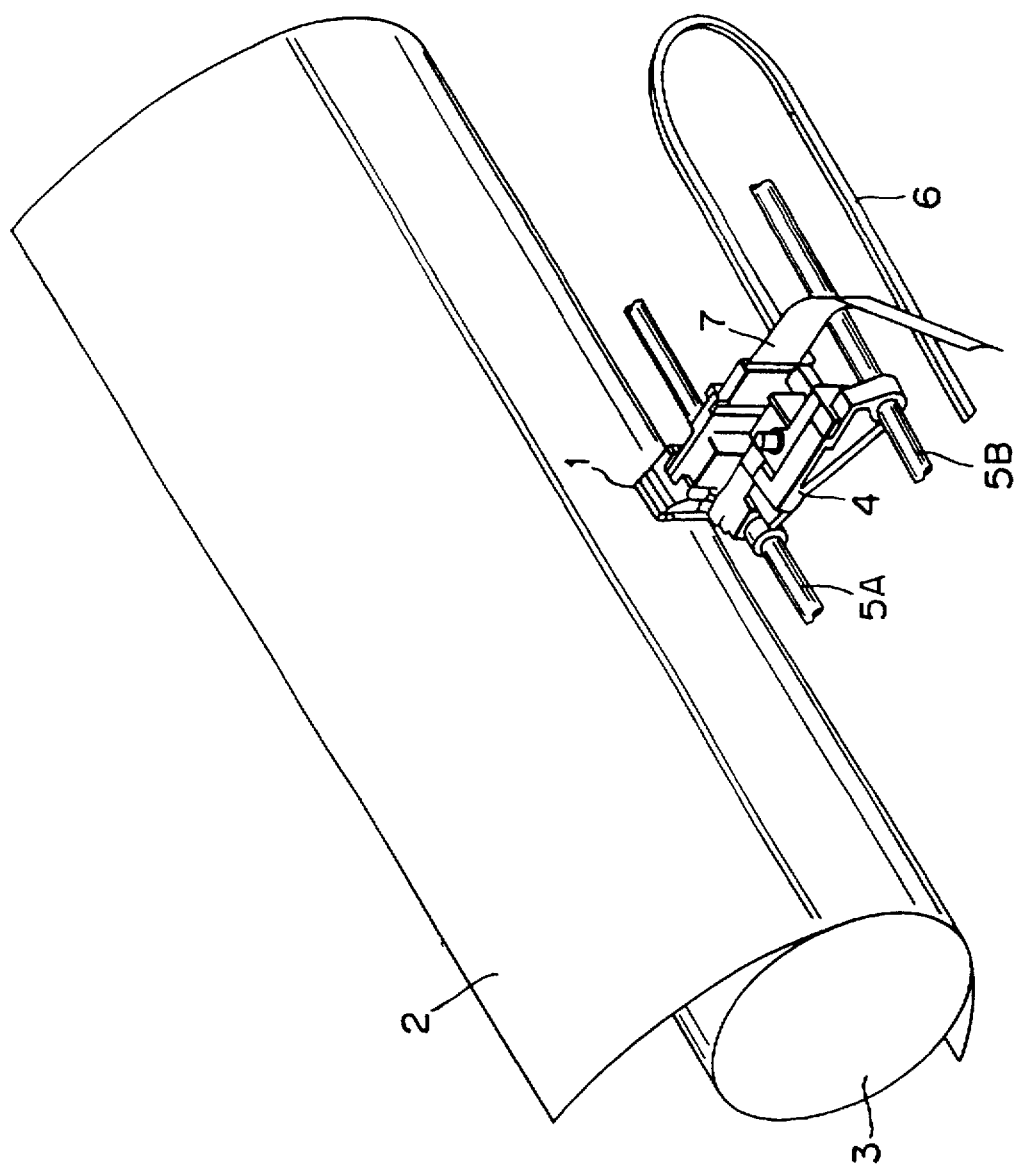
FIG. 1 is a general perspective view showing one embodiment of an ink-jet printing apparatus according to the present invention.

FIG. 1 is a general perspective view showing an ink-jet printing apparatus, to which one embodiment of a printing system according to the present invention is applied.

In FIG. 1, a reference numeral 1 denotes an ink-jet head, in which 128 ejection orifices are arranged at a density of 400 dpi (dot per inch). In each liquid passage having each orifice as an ejection orifice, a heating element for generating energy to be utilized for ejection is provided. The heating element generates heat depending upon an electric pulse applied thereto and causes film boiling of an ink and causes ejection of the ink through the ejection orifice associating with growth of bubble due to film boiling. It should be noted that, in the shown embodiment, the ejection frequency, namely the drive frequency of the heating element, is 2 kHz.

The reference numeral 4 denotes a carriage for moving with carrying the head 1. The motion of the carriage 4 is guided by two guide shafts 5A and 5B which slidably engage with a part of the carriage. The reference numeral 6 denotes an ink supply tube for supplying the ink to the head 1 from a not shown ink tank. The reference numeral 7 denotes a flexible cable for transmitting a drive signal depending upon an image signal from a not shown control portion of the shown apparatus to the heating body provided at a portion of the head 1. The ink supply tube 6 and the flexible cable 7 are both formed of flexible materials so as to follow motion of the carriage. Also, the carriage 4 is connected to a part of a not shown belt which extends in parallel to the guide shafts 5A and 5B and is adapted to move the carriage. The carriage 4 is thus driven to move by driving the belt by means of a not shown carriage motor.

The reference numeral 3 denotes a platen having longitudinal axis extending in parallel relationship with the guide shafts 5A and 5B. The reference numeral 2 denotes a printing paper. The head 1 ejects ink to a portion of the printing paper 2 opposing to the ejection orifice of the head 1 for performing printing associated with moving of the carriage.

Figure 2:
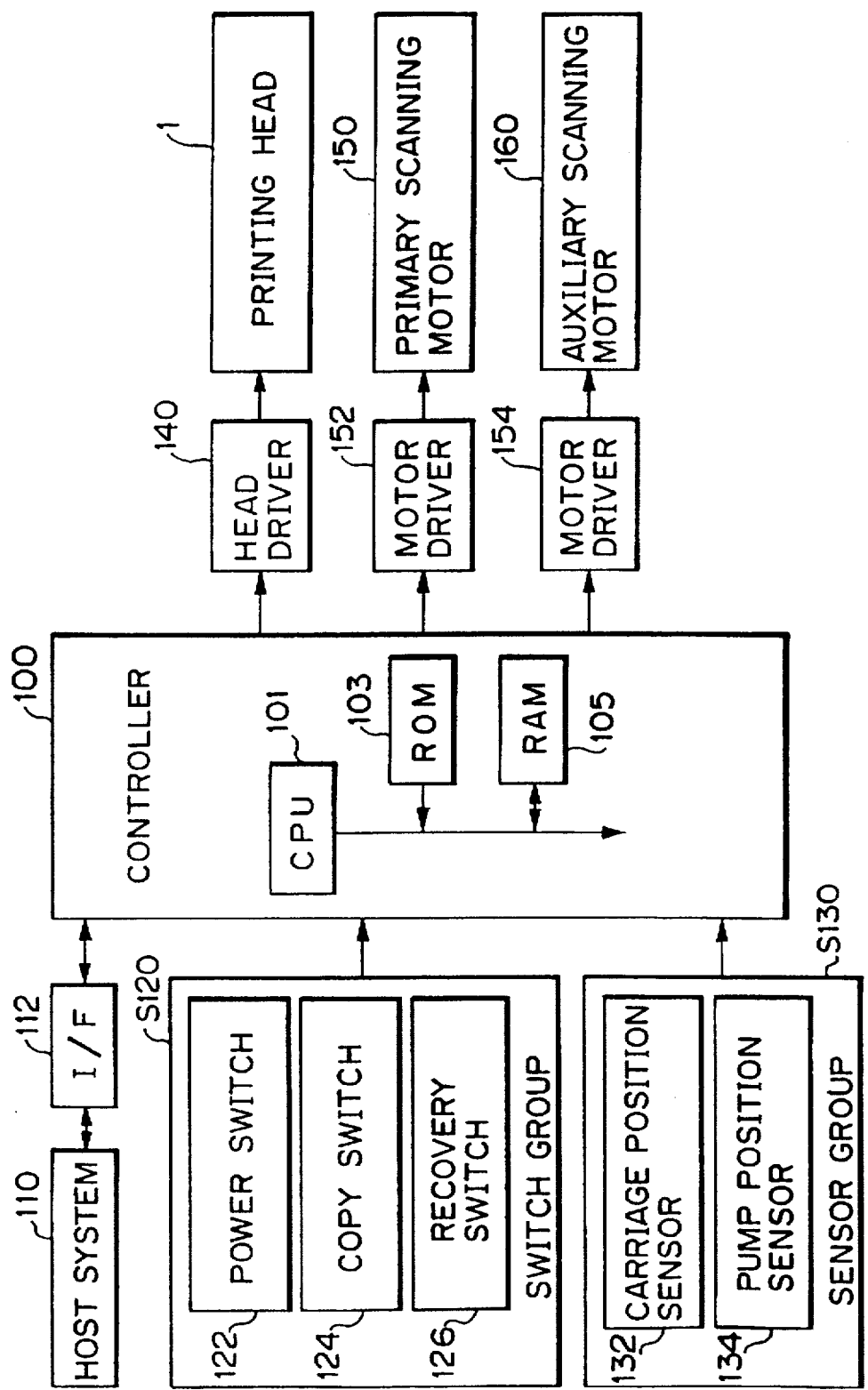
FIG. 2 is a block diagram showing a construction of a control system of one embodiment of the ink-jet printing apparatus according to the invention.

FIG. 2 is a block diagram showing an example of construction of a control system in the preferred embodiment of the ink-jet printing apparatus as set forth above.

Here, the reference numeral 100 denotes a controller forming a main control portion. The controller 100 includes a CPU 101 in a form of a microcomputer executing a sequence shown later, for example, a ROM 103 which stores a program corresponding to a procedure of execution of the sequence, a voltage value and a pulse width of a heat pulse and other fixed data, and a RAM 105 having a region to develop an image data, a work region and so forth. The reference numeral 110 denotes a host system (which may be a reader portion for reading an image) forming an image data source. The host system 110 exchanges image data, other commands, status signal and so forth with the controller via an interface (I/F) 112.

The reference numeral 120 denotes a switch array accepting commands input by an operator, such as a power switch 122, a copy switch 124 for commanding printing (copying) and a recovery switch 126 for commanding initiation of an ejection, recovery operation. The reference numeral 130 denotes a sensor group for detecting condition of the apparatus, such as a sensor 132 for detecting position of carriage, e.g. home position, start position and so forth, and a sensor 134 including a leaf switch and used for detecting a position of the pump.

The reference numeral 140 denotes a head driver for driving a electrothermal transducing element of the printing head depending upon the printing data. The reference numeral 150 denotes a primary scanning motor for driving the carriage in the primary scanning direction (left and right direction in FIG. 1), the reference numeral 152 denotes a driver for the primary scanning motor. The reference numeral 160 denotes an auxiliary scanning motor for feeding the printing medium (auxiliary scanning).

Discussion will be given hereinafter with respect to level half tone printing employing the shown apparatus.

Figure 3A:
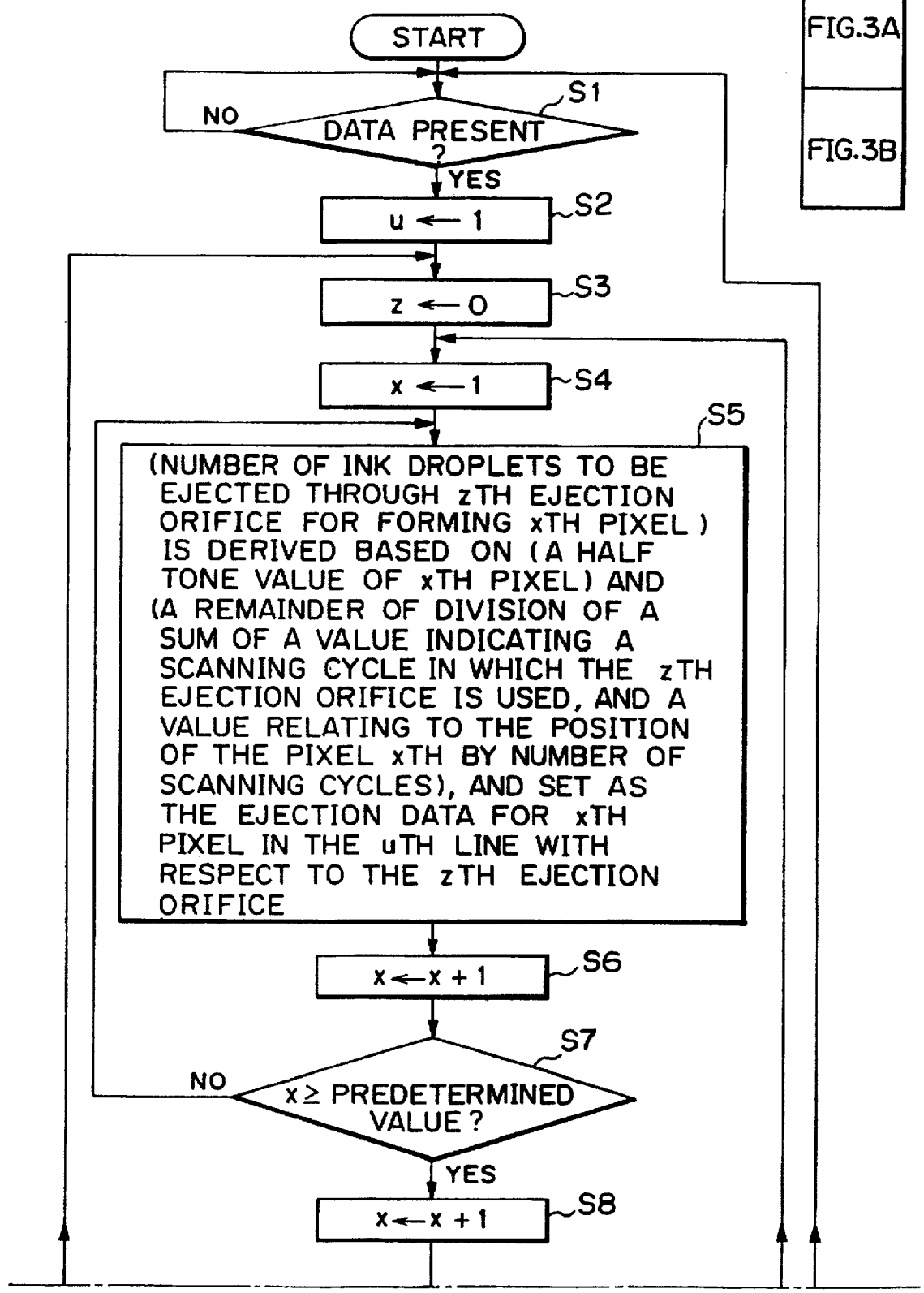
Figure 3B:
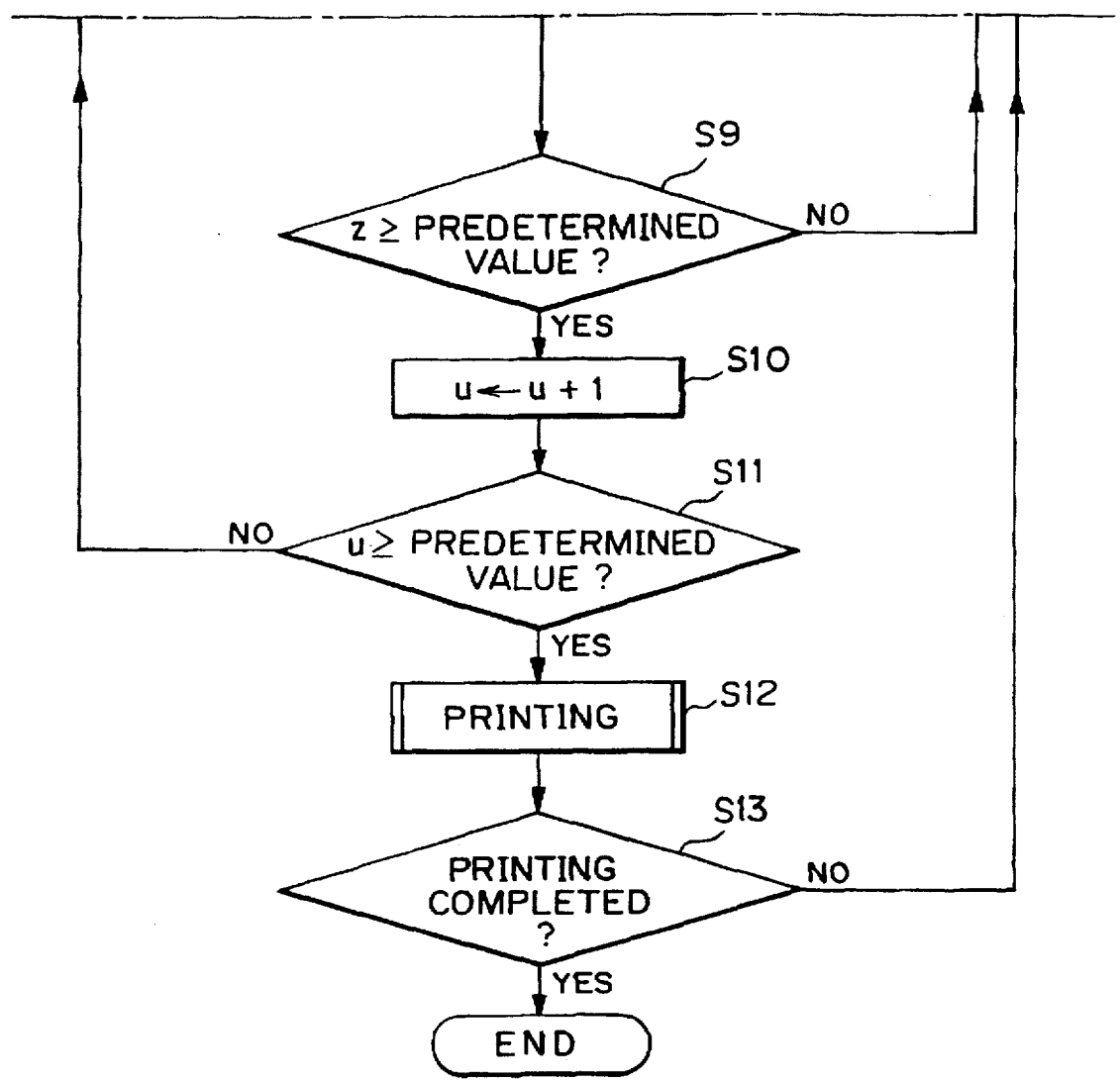

FIGS. 3A and 3B are flowcharts mainly showing in concept an ejection data distribution process for performing 17 level gray scale printing.

In advance of initiation of the printing operation (step S12) by triggering the process in the shown embodiment of the apparatus, ejection data distribution for respective ejection orifices is performed through steps S1 to S11 of FIGS. 3A and 3B.

At first, at the step S1, a check is performed whether data for one page is received from the host system 110. If reception of data for one page is confirmed, initialization of various parameters is performed through steps S2 to S4. Namely, a parameter u represents a region (line) in one page to be printed, to which region the ejection orifices in question for data distribution are assigned for printing of the region, in relation to feeding of the printing medium. For instance, u=1 represents the line to be firstly printed by using an assigned ejection orifices. Also, a parameter z represents a number of the ejection orifice in question for data distribution, and a parameter x represents a pixel position in the primary scanning direction.

Next, at a step S5, as set out later with reference to FIG. 4 and other figures, the number of the ink droplets (ejection data) to be ejected through the Zth ejection orifice subjected to an ejection data distribution process is derived on the basis of a half tone value of the xth pixel, and a remainder of division of a sum of a value indicating the scanning cycle, in which the Zth ejection orifice is used, namely a value indicating the current scanning cycle in the case that the xth pixel is formed with a plurality of scanning cycles and a value relating to the pixel position x by number of scanning cycles required for forming the xth pixel, and is set as the ejection data for xth pixel in the uth line with respect to the Zth ejection orifice.

Foregoing process is performed for all of the pixels in the primary scanning direction (steps S6 and S7) and also for all of the ejection orifices of the ink-jet head (steps S8 and S9). When these process is completed, distribution of the ejection data relating to the next line is performed up to the final line (step S10, S11).

The foregoing discussion briefly shows the manner of distribution of the ejection data. The detail of the process of ejection data distribution will be discussed below more concretely.

The shown embodiment of the apparatus is designed to perform printing with varying numbers of ink droplets within a range of 0 to 16. FIG. 4 is an explanatory illustration for explaining a printing operation to be performed in the shown embodiment of the ink-jet printing apparatus.

The reference numeral 1 denotes the printing head illustrated diagrammatically, in which 128 ejection orifices are arranged in a vertical direction. For convenience of discussion, respective ejection orifices are given ejection orifice number "z", 0, 1, 2, . . . , 127 from up to down. Upon performing printing on the printing paper 2, at every one cycle of scanning of the carriage 4, the printing paper 2 is fed upwardly in the drawing in the magnitude corresponding to 32 ejection orifices (hereinafter, this magnitude of feeding of the printing paper 2 will be referred to as "M=32". The scanning speed of the carriage 4 is 31.75 mm/sec. and the ejection frequency of the head is 2 kH. By this arrangement, each pixel on the printing paper is formed with maximum 4 droplets to be ejected through each of 4 different ejection orifices, i.e. maximum 16 droplets in total, in a resolution of 400 dpi. (These four ejection orifices will be expressed as S=128/32=4.) Namely, according to feeding of the printing paper 2, the above-mentioned region corresponding to one line is printed by four times of scan by using 32 ejection orifices.

Next, discussion will be given for a manner to derive the number of ink droplets to be ejected depending upon the half tone value K (x, y) when the pixel is formed at the pixel position (x, y) on the printing medium 2. It should be noted that K(x, y) is variable in the range of 0 to 16.

Here, definition will be given for operators to be used in the following discussion. An operator "/" is an operator indicating derivation of quotient by dividing an integer before the operator by an integer after the operator, in the operation expression, and an operator "%" is an operator indicative of remainder in division of the integer before the operator by the integer after the operator. It should be noted that the operators "/" and "%" have higher priority in the operation than operators "+" and "−" which represent an addition and a subtraction, respectively.

Figure 4:
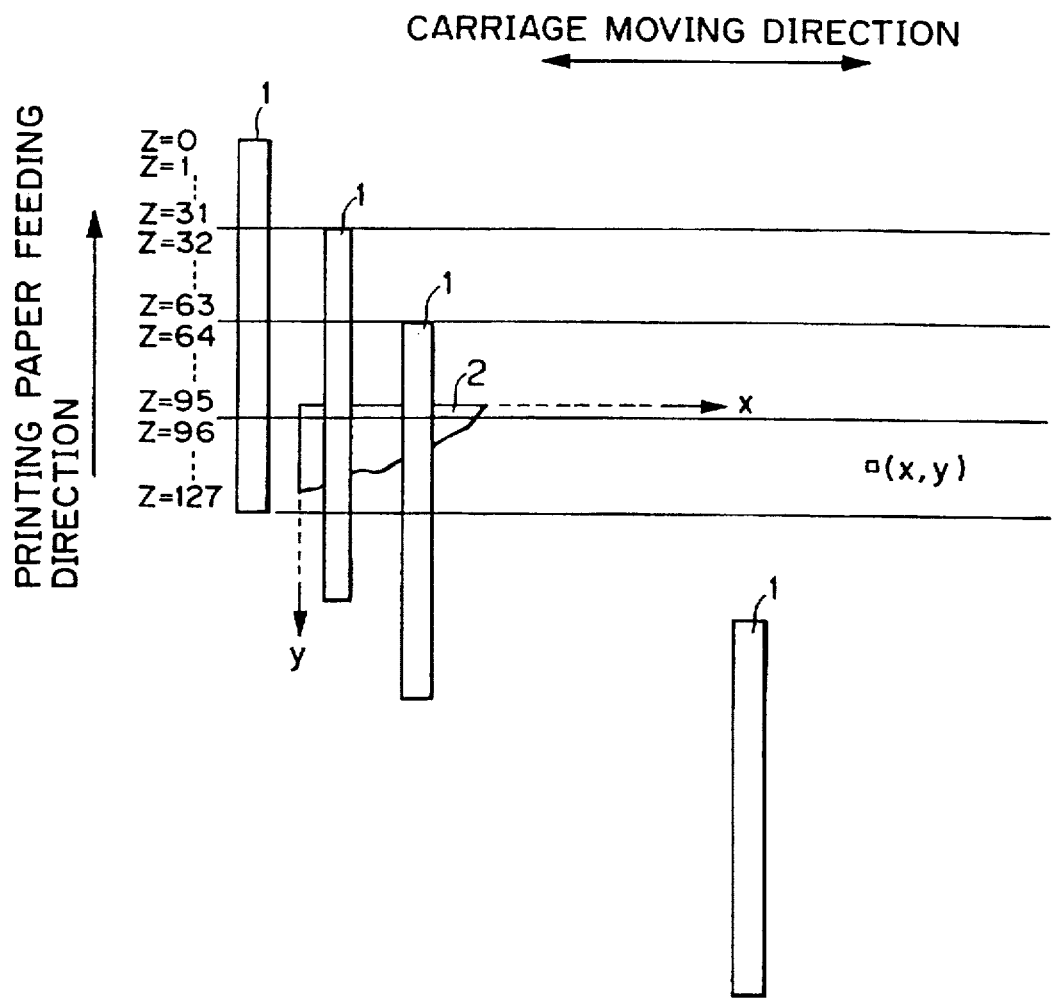
FIG. 4 is an explanatory illustration for explanation of scanning of an ink-jet head in one embodiment of the ink-jet printing apparatus of the invention.

In FIG. 4, in the first scan cycle, using M in number (M=32) of ejection orifices of z=96 to 127, A in number of ink droplets derived from the following equation (1) is ejected to the corresponding position (x, y) on the printing paper 2 depending upon the half tone value K(x, y) of the pixel assigned by the printing data. In the following equation (1), z is a number of the ejection orifice to be used for formation of the pixel on the pixel position (x, y) during current scanning cycle. It should be clear from the foregoing definition of the operator, that in the first scan, z/M=3 is established.

$$A = (K(x, y) + (z/M + x))\% \, S)/S \quad (1)$$

Next, after feeding the printing paper 2 upwardly in the magnitude corresponding to 32 ejection orifices, second scan is performed for A in number of ink droplets derived from the foregoing equation (1) for each pixel using (2×M) in number of ejection orifices, i.e. z=64 to 127.

Subsequently, by repeating the similar process, printing is performed sequentially on the printing paper.

Manner of deriving the number of ink droplets to form each pixel will be discussed hereinafter in terms of an example.

With respect to two pixels adjacent in the x direction and positioned at coordinate positions (x, y) in the pixel position at (100, 100) and (101, 100), it is assumed that the half tone values K(100, 100) and K(101, 100) of these pixels are both 2, and S's are 4. In this case, the pixels at the coordinates (100, 100) and (101, 100) correspond to the ejection orifices of z=100, z=68, z=36 and z=4.

In this case, in the fourth scan, according to the foregoing equation (1), A=1 is established for the coordinate (100, 100) and A=0 is established for the coordinate (101, 100). Therefore, through the ejection orifice having ejection orifice number of z=100, one ink droplet is ejected to the pixel designated by the coordinate (100, 100). However, no ink droplet is ejected to the pixel at the coordinate (101, 100) (see equation (2)).

$$A = (2 + (100/32 + x)\%4)/4 \quad (2)$$
$$= (2 + (3 + x)\%4)/4$$

Next, in the fifth scan, through calculation of the following equation (3) employing the foregoing equation (1), A=1 is established for both of the coordinates (100, 100) and (101, 100). Accordingly, respective one ink droplet are ejected to respective pixel positions through the ejection orifice of the ejection orifice number of z=68 (see equation (3)).

$$A = (2 + (68/32 + x)\%4)/4) \quad (3)$$
$$= (2 + (2 + x)\%4)/4$$

Furthermore, in the sixth scan, A=0 is established for the coordinate (100, 100) as expressed in the following equation (4), and A=1 is established for the coordinate (101, 100). Therefore, no ink droplet is ejected to the pixel at the coordinate (100, 100) and one ink droplet is ejected to the pixel at the coordinate (101, 100), through the ejection orifice of z=36 (see equation (4)).

$$A = (2 + (34/32 + x)\%4)/4 \quad (4)$$
$$= (2 + (1 + x)\%4)/4$$

Finally, in the seventh scan, A=0 is established for both of the coordinates (100, 100) and (101, 100). Therefore, no ink droplet is ejected through the ejection orifice of z=4 for both pixels (see equation (5)).

$$A = (2 + (4/32) + x)\%4)/4 \quad (5)$$
$$= (2 + x\%4)/4$$

As set forth above, for the pixel at the coordinate of (100, 100), respective one ink droplets are ejected through the ejection orifices of z=100 and z=68, and for the pixel at the coordinate of (101, 100), respective one ink droplets are ejected through the ejection orifices z=68 and z=36. Thus respective pixels of half tone value K=2 are formed.

The foregoing operation is also performed for x=102, 103 (y=100), for example. Then, the ejection orifices to be used for respective pixels can be shown in the following tables.

| Ejection Orifice Number z | | Pixel Position x | | | | |
|---|---|---|---|---|---|---|
| | | 100 | 101 | 102 | 103 | ... |
| 100 | ... | 1 | 0 | 0 | 1 | ... |
| 68 | ... | 1 | 1 | 0 | 0 | ... |
| 36 | ... | 0 | 1 | 1 | 0 | ... |
| 4 | ... | 0 | 0 | 1 | 1 | ... |

1: used
0: not-used

As can be clear from the foregoing discussion and the table, the ejection orifices are separated into a ejection orifice group (z=100, 68 at x=100) to be used preferentially, and another ejection orifice group (z=36, 4 at x=100) to be not used preferentially. The number of ink droplets to be ejected through respective ejection orifices in the ejection orifice group to be preferentially used is always greater than that of the other ejection orifice group in one ink droplet. In addition, the ejection orifices in the ejection orifice group to be preferentially used are varied sequentially, and the ejection orifices to be used for pixels arranged in the x direction are varied sequentially.

As can be appreciated from the discussion given hereabove, when the half tone data K(x, y) is greater than or equal to 2, the pixel is formed by the different ejection orifices whose number is greater than or equal to 2 and N/M at the maximum. Here, even when printing is performed at relatively low density in such a case that the half tone data is 2, since ejection orifices are sequentially varied in the scanning direction of the head, four ejection orifices can be used uniformly. Therefore, an image, in which line due to non-uniformity of density is not perceptible, can be obtained for equalization of fluctuation of volume of an ink droplet and of fluctuation of ejection characteristics at each ejection orifice.

The foregoing equation (1) in the shown embodiment is effective in sequentially varying the ejection orifices to be used in the x coordinate. However, such effect is not specific to the foregoing equation (1) but can be achieved by various manners. For instance, the following equation (6) ray achieve the similar or the same effect to the equation (1). In addition, when F(x) in the equation (6) can be expressed by the following equation (7), exemplarily, respective one droplets may be ejected through the ejection orifices of the ejection orifice numbers z=100 and z=68 for the pixel at the coordinate (100, 100), and respective one droplets may be ejected through the ejection orifices of the ejection orifice numbers z=36 and z=4 for the pixel at the coordinate (101, 100).

$$A = (K(x, y) + (z/M + F(x)))\% \ S)/S \quad (6)$$

wherein F(x) is a function of x $$F(x) = 2 \times x \quad (7)$$

It should be noted that while the foregoing embodiment is designed with taking fluctuation of the head in the primary scanning direction (x direction) into account, fluctuation in the feed direction of the printing paper may be taken into account by replacing x in the foregoing equation (1) or (6) with y. By such arrangement, a number of ink droplet can be determined with taking density non-uniformity in the y direction into account.

Figure 5B:
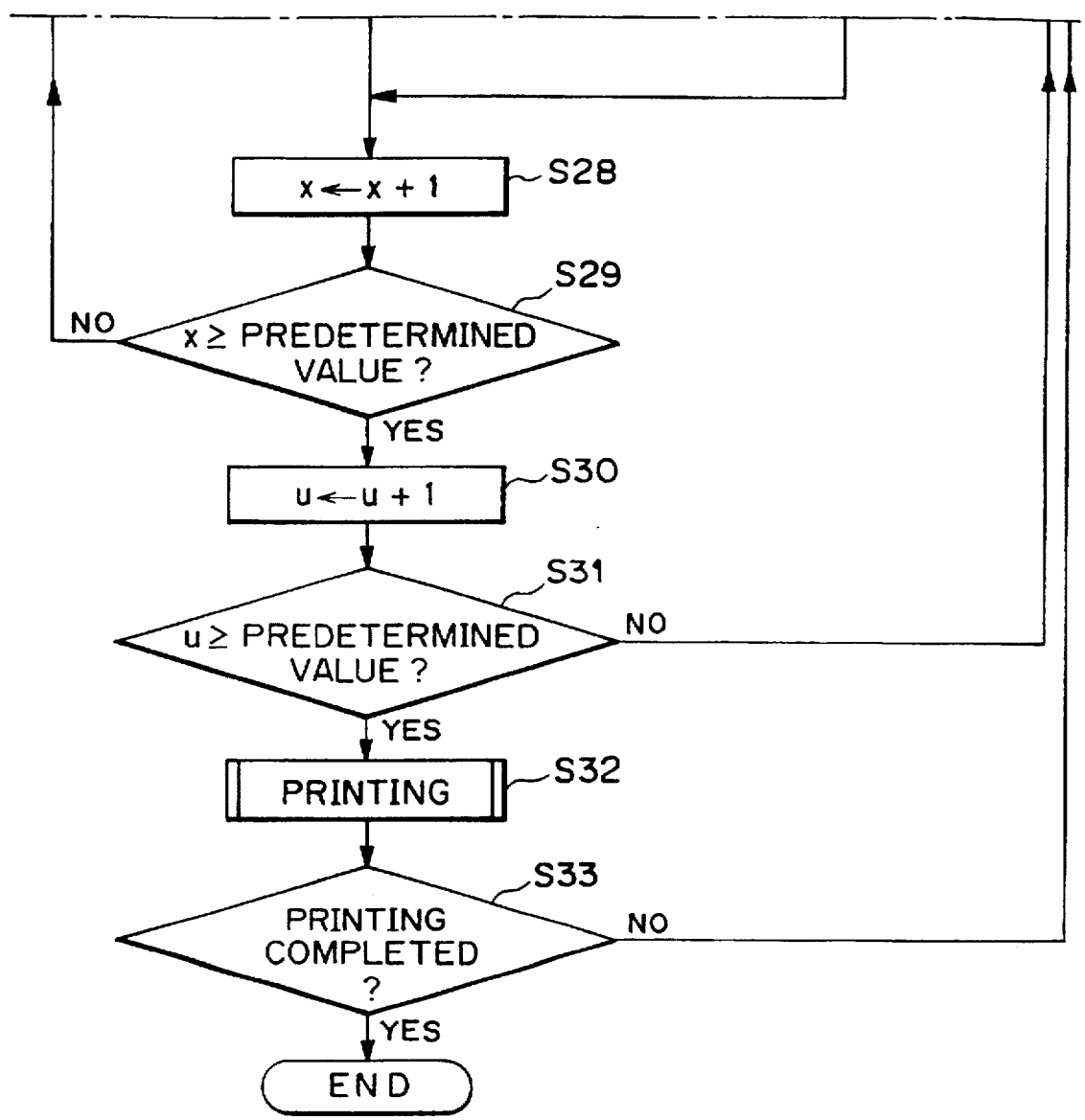

FIGS. 5A and 5B show flowcharts showing another process which may perform distribution of the ejection data similarly to the foregoing embodiment. More specifically, in distribution of the ejection data, the ejection orifice group to which the ejection data is preferentially distributed is preliminarily set to be sequentially varied at every x of the pixel positions and distribution of the ejection data is performed according to the preferential order.

At a step S24 of FIG. 5A, when the xth pixel has the half tone data to be formed with T in number of ink droplets, T is divided by the number of the mutually different ejection orifices S to be used for forming one pixel. Then, at a step S25, judgement is made whether T/S contains a remainder or not. When remainder is present, data for ejecting (B+1) (B is a quotient in integer of T/S by rounding down a fraction smaller than 1) in number of ink droplets are set for the ejection orifices up to Ath (A is a remainder of T/S) among S in number of ejection orifices forming the pixel in accordance with predetermined preferential order, and for remaining (S–A) in number of ejection orifices, ejection data corresponding to B in number of ink droplets are distributed.

On the other hand, when judgement is made at the step S25 that no remainder is present, the ejection data for T/S in number of ink droplets are distributed for S in number of ejection orifices, at a step S27.

As set forth above, even through the process illustrated in FIG. 5, distribution of ejection data comparable with that of FIG. 3 can be performed.

It should be noted that while the foregoing embodiment is designed with taking fluctuation of the head in the primary scanning direction (x direction) into account, fluctuation in the feed direction of the printing paper may be taken into account by replacing x in the foregoing equation (1) or (6) with y. By such arrangement, a number of ink droplets can be determined with taking density non-uniformity in y direction into account.

Also, the application of the present invention is not limited to a bubble-jet system, in which ink is ejected by generating a head depending upon the electric pulse. The present invention is equally applicable for piezo-jet printing, thermal printing system with similar effect.

The present invention achieves distinct effect when applied to a printing head or a printing apparatus which has means for generating thermal energy such as electrothermal transducers or laser light, and which causes changes in ink by the thermal energy so as to eject ink. This is because such a system can achieve a high density and high resolution printing.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet printing systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to printing information; second, the thermal energy induces sudden temperature rise that exceeds the nucleate boiling so as to cause the film boiling on heating portions of the printing head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better printing.

U.S. Pat. Nos. 4,558,333 and 4,459,600 disclose the following structure of a printing head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the printing head, the present invention can achieve printing positively and effectively.

In addition, the present invention can be applied to various serial type printing heads: a printing head fixed to the main assembly of a printing apparatus; a conveniently replaceable chip type printing head which, when loaded on the main assembly of a printing apparatus, is electrically connected to the main assembly, and is supplied with ink therefrom; and a cartridge type printing head integrally including an ink reservoir.

It is further preferable to add a recovery system, or a preliminary auxiliary system for a printing head as a constituent of the printing apparatus because they serve to make the effect of the present invention more reliable. As examples of the recovery system, are a capping means and a cleaning means for the printing head, and a pressure or suction means for the printing head. As examples of the preliminary auxiliary system, are a preliminary heating means utilizing electrothermal transducers or a combination of other heater elements and the electrothermal transducers, and a means for carrying out preliminary ejection of ink independently of the ejection for printing. These systems are effective for reliable printing.

The number and type of printing heads to be mounted on a printing apparatus can be also changed. For example, only one printing head corresponding to a single color ink, or a plurality of printing heads corresponding to a plurality of inks different in color or concentration can be used. In other words, the present invention can be effectively applied to an apparatus having at least one of the monochromatic, multi-color and full-color modes. Here, the monochromatic mode performs printing by using only one major color such as black. The multi-color mode carries out printing by using different color inks, and the full-color mode performs printing by color mixing.

Furthermore, although the above-described embodiments use liquid ink, inks that are liquid when the printing signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the printing medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the printing signal. In such cases, the ink may be retained in recesses or through holes formed in a porous sheet as liquid or solid substances so that the ink faces the electrothermal transducers as described in Japanese Patent Application Laying-open Nos. 56847/1979 or 71260/1985. The present invention is most effective when it uses the film boiling phenomenon to expel the ink.

Furthermore, the ink jet printing apparatus of the present invention can be employed not only as an image output terminal of an information processing device such as a computer, but also as an output device of a copying machine including a reader, and as an output device of a facsimile apparatus having a transmission and receiving function.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An ink-jet printing apparatus using an ink-jet head having a plurality of ejection orifices, forming a pixel by ejecting ink through the ink-jet head toward a printing medium for performing printing with a set of the pixels, comprising:

primary scanning means for moving the ink-jet head in a primary scanning direction;

feeding means for feeding the printing medium in an auxiliary scanning direction different from the primary scanning direction;

determining means for determining a number of ink droplets to be ejected through ejection orifices of the ink-jet head during a plurality of movements of the ink-jet head in the primary scanning direction so as to form respective pixels using ink droplets elected from different ejection orifices of the ink-let head, respectively, the number of ink droplets being determined in accordance with a half tone value of the respective pixels, and a remainder from division of a sum of (i) a value corresponding to a scanning cycle in which a predetermined election orifice is used in the primary scanning direction for forming the pixel among a plurality of scanning cycles, and (ii) a value corresponding to a position of the pixel in the primary scanning directions, by a number of the plurality of scanning cycles; and control means for controlling ejection of the number of ink droplets determined by said determining means at each pixel position in each scanning cycle in the primary scanning direction.

2. An ink-jet printing apparatus as claimed in claim 1, wherein a number of ink droplets A is determined by:

$$A=(K(x, y)+(z/M+F(x)\%S)/S$$

wherein $K(x, y)$ is a half tone value at a pixel position x,y (x and y respectively represent a position in the primary scanning direction and the auxiliary scanning direction), z is an ejection orifice number, M is a feeding amount of the printing medium expressed by a number of the ejection orifices, $F(x)$ is a predetermined function of the pixel position x, S is a number of ejection orifices ejecting ink to form the pixel, the operator "%" represents derivation of remainder in division of an integer therebefore by an integer thereafter, and the operator "/" represents derivation of an integer quotient in division of an integer therebefore by an integer thereafter.

3. An ink-jet printing apparatus as claimed in claim 2, wherein $F(x)$, the predetermined function of the pixel position x, is expressed by $F(x)=x$.

4. An ink-jet printing apparatus as claimed in claim 2, wherein $F(x)$, the predetermined function of the pixel position x, is expressed by $F(x)=2x$.

5. An ink-jet printing apparatus as claimed in claim 2, wherein said ink-jet head generates a bubble in the ink utilizing a thermal energy and ejects ink associating with generation of the bubble.

6. An ink-jet printing apparatus as claimed in claim 1, using a black colored ink as the ink.

7. An ink-jet printing apparatus as claimed in claim 1, using a plurality of colors of ink as the ink.

8. An ink-jet printing apparatus as claimed in claim 1, wherein said ink-jet printing apparatus is usable with a copying apparatus.

9. An ink-jet printing apparatus as claimed in claim 1, wherein said ink-jet printing apparatus is usable with a facsimile apparatus.

10. An ink-jet printing apparatus as claimed in claim 1, wherein said ink-jet printing apparatus is usable with a terminal apparatus for a computer.

11. An ink-jet printing method for forming one pixel with m ink droplets (where m is an integer $\geq 2$) using an ink-jet head having n ejection orifices (where n is an integer $\geq 2$), comprising the steps of:

providing an ink let head such that the n ejection orifices of the ink-jet head are arrayed in a direction perpendicular to a direction of relative movement of a printing medium and the ink-jet head, and such that each pixel is formed by ejecting m ink droplets through S different ejection orifices (where S is an integer corresponding to n/L excluding a fraction less than 1, and L is a number of election orifices corresponding to a distance of relative movement of the ink-jet head and the recording medium) for every relative movement between the ink-jet head and the printing medium;

performing image formation of the pixel by ejecting T ink droplets according to a half tone data of the pixel (where T is an integer $\geq m$), the pixel being formed by ejecting (B+1) ink droplets (where B is an integer derived from T/S excluding a fraction less than 1) through ejection orifices up to an Ath numbered ejection orifice from an ejection orifice of a highest preferential order (where A is a remainder of T/S) and ejecting B ink droplets through (S−A) ejection orifices in a lower preferential order, when there is a preferential order for use of S different ejection orifices, and a remainder of T/S is present; and performing image formation of the pixel with T ink droplets by ejecting T/S ink droplets through S different ejection orifices, when the remainder of T/S is not present.

12. An ink-jet printing method as claimed in claim 11, further comprising the step of electing ink by generating a bubble in the ink utilizing thermal energy.

* * * * *

UNITED STATES PATENT AND TRADEMARK OFFICE
CERTIFICATE OF CORRECTION

PATENT NO. : 5,790,141
DATED : August 4, 1998
INVENTOR(S) : TADASHI YAMAMOTO

It is certified that error appears in the above-identified patent and that said Letters Patent is hereby corrected as shown below:

ON THE TITLE PAGE:

Item [56]

REFERENCES CITED

FOREIGN PATENT DOCUMENTS [56]

"54056847" should read --54-056847--.

COLUMN 1

Line 20, "measure" should be deleted.

COLUMN 4

Line 7, "(ejection" should read --ejection--.

COLUMN 6

Line 19, "Performing" should read --performing--.

COLUMN 11

Line 43, "let" should read --jet--.
   Line 48, "election" should read --ejection--.
   Line 52, "directions," should read --direction,--.

UNITED STATES PATENT AND TRADEMARK OFFICE
CERTIFICATE OF CORRECTION

PATENT NO. : 5,790,141
DATED : August 4, 1998
INVENTOR(S) : TADASHI YAMAMOTO

It is certified that error appears in the above-identified patent and that said Letters Patent is hereby corrected as shown below:

<u>COLUMN 12</u>

Line 42, "election" should read --ejection--.
Line 48, "$\geq$" should read --$\leq$--.
Line 64, "electing" should read --ejecting--.

Signed and Sealed this

Twentieth Day of April, 1999

Q. TODD DICKINSON

Attest:

Attesting Officer

Acting Commissioner of Patents and Trademarks